United States Patent [19]

Ohtani

[11] Patent Number: 4,918,540
[45] Date of Patent: Apr. 17, 1990

[54] SYSTEM FOR ENCODING OR DECODING ANALOG VIDEO SIGNALS

[75] Inventor: Nobuhiro Ohtani, Tokyo, Japan
[73] Assignee: NEC Corporation, Japan
[21] Appl. No.: 225,538
[22] Filed: Jul. 28, 1988
[30] Foreign Application Priority Data Jul. 29, 1987 [JP] Japan ................................ 62-191089

[51] Int. Cl.[4] .............................................. H04N 1/41
[52] U.S. Cl. .................................. 358/429; 358/261.1
[58] Field of Search ...................... 358/260, 261.1, 280, 358/283, 429

[56] References Cited

U.S. PATENT DOCUMENTS

| | | | |
|---|---|---|---|
| 4,110,795 | 8/1978 | Spencer | 358/429 |
| 4,353,096 | 10/1982 | Sakurai | 358/429 |
| 4,782,400 | 11/1988 | Ohtani | 358/429 |

Primary Examiner—Edward L. Coles, Sr.
Attorney, Agent, or Firm—Laff, Whitesel, Conte & Saret

[57] ABSTRACT

An encoder/decoder for video signals is especially designed for truer conversion of half-tone signals. An image scanner produces analog signals which are converted to digital signals and buffer stored for eliminating timing differences. Then, the signals are preprocessed to increase the run-length of the digital video signals. The signals are monitored both before and after the preprocessing. A comparison of these monitored signals leads to a selection of the one signal before or after preprocessing which appears to be the best. That selected signal has a tag inserted to demark it from the next succeeding signal and to indicate whether the preprocessing was or was not included in the transmitted signal. The tag signal is used to include or exclude a post processing in order to undo the encoding.

15 Claims, 4 Drawing Sheets

4,918,540

SYSTEM FOR ENCODING OR DECODING ANALOG VIDEO SIGNALS

BACKGROUND OF THE INVENTION

The present invention relates to an encoder and a decoder for use in a digital transmission of video signals, and more particular to an encoder and a decoder for respectively encoding and decoding video signals including halftones.

Video signals obtained by scanning a pictorial advertisement, a photograph or the like with a scanner usually are analog signals having halftones. One of the prior art methods of converting such analog video signals into binary signals is to convert the analog signals to pseudo-halftone signals by an ordered diether method. This method generates a bit sequence of "1" and "0". The consecutive black and white lengths of this signal sequence is run-length encoded.

The ordered dither method uses an n-by-n dither matrix storing thresholds for conversion into a bit sequence consisting of "1" and "0" codes. The thresholds periodically vary in the directions of the main scan and the subscan. Thus, an analog video signal sequence representing gray is converted into a bit sequence of periodic black and white pixels. Accordingly, the run-length is short and the number of runs is great. Therefore, the compression efficiency of the run-length encoding is extremely low. The U.S. Pat. No. 4,475,127 reveals a preprocessing circuit (logic converter circuit) for a run-length encoding, at a high compression efficiency, of signal sequences which are obtained by the ordered dither method.

This preprocessing circuit converts a signal sequence consisting of "1" and "0" codes, in which white and black pixels periodically alternate, into a new signal sequence in which the run-lengths of "1" and "0" are greater. The preprocessing circuit includes a circuit for generating a signal indicating whether a sum of a number of n signals is an odd or even number. These n signals comprise an input signal and signals produced by delaying that input signal by 1, 2, 3 . . . , (n−1) sampling periods.

Such a prior art encoder for halftone signals is usually structured to permit the operator to choose, on every occasion of transmission, whether run-length encoding of the pseudo-halftone signals preprocessed to be transmitted or run-length encoding of unpreprocessed signals are to be sent. The conventional preprocessing circuit, though having the advantage of extending the run-length of pseudo-halftone signals, such as dither signals or mesh-point signals, also has an effect which shortens the run-length of non-halftone binary signals. It has the disadvantage of a lower compression efficiency in the run-length encoding of preprocessed signals than the compression efficiency of unpreprocessed signals where halftone pictures and non-halftone pictures, such as characters, are coexistent on a document.

SUMMARY OF THE INVENTION

An object of the present invention is to provide an encoder apparatus and a decoder apparatus capable of run-length encoding and decoding, respectively. Another object is to enable such an apparatus to function properly, even for a frame in which half-tone and two-value video signals are coexistent, without deteriorating the compression efficiency.

In an encoder apparatus according to the invention, an analog-to-digital (A/D) converter means first converts halftone video signals of pixels into first digit signals of "1" or "0" bits by comparing the halftone video signals with threshold data that is periodically generated. This A/D converting means uses, for instance, an ordered dither method. The first digital signals are converted into the second digital signals by converting means. The converting means extends the run-lengths of "1" and "0" codes of the first digital signals depending upon the characteristics of the first digital signals. The number of runs contained in the first digital signals from the A/D converting means is counted by first counting means. A second counting means counts the number of runs contained in each line of the second digital signals received from the converting means. A selecting means selects any of the first and second digital signals according to the number of the counts of the first and second counting means. The first digital signals are selected when the count output of the first counting means is smaller than the count output of the second counting means. Encoding means encodes the digital signals selected by the selecting means by a run-length encoding, and generates encoded video signals. First and second tag data indicating the selection of the first and second digital signals, respectively, by the selecting means are inserted by the tag inserting means into every encoded video signals of a line from the encoding means.

A decoder apparatus, according to the invention, coupled to the tag inserting means of the encoder, decodes the encoded video signals and outputs the decoded signals to an output line. The decoder includes tag detecting means for detecting the first and second tag data from the encoded video signals, decoding means for decoding the encoded video signals. Third digital signals outputting means converts, in a manner which is opposite to the manner of the converting means of the encoder, in order to change the third digital signals from the decoding means into fourth digital signals. The third digital signals are selectively sent out, if the tag detecting means detects the first tag datum or, the fourth digital signals are sent after, if the tag detecting means detects the second tag datum. Either the third or the fourth digital signals appear on, to the output line of the decoder.

A feature of the present invention comprises the monitoring, line by line, of first digital video signals from the A/D converter and of second digital video signals processed by the converting means, followed by the selection of whichever is the higher in the efficiency of compression by run-length encoding.

BRIEF DESCRIPTION OF THE DRAWINGS

The present invention will be better understood from the following detailed description taken in conjunction with the accompanying drawings in which.

DETAILED DESCRIPTION OF THE PREFERRED EMBODIMENT

Next will be described in detail a preferred embodiment of the present invention with reference to the accompanying drawings.

Figure 1:
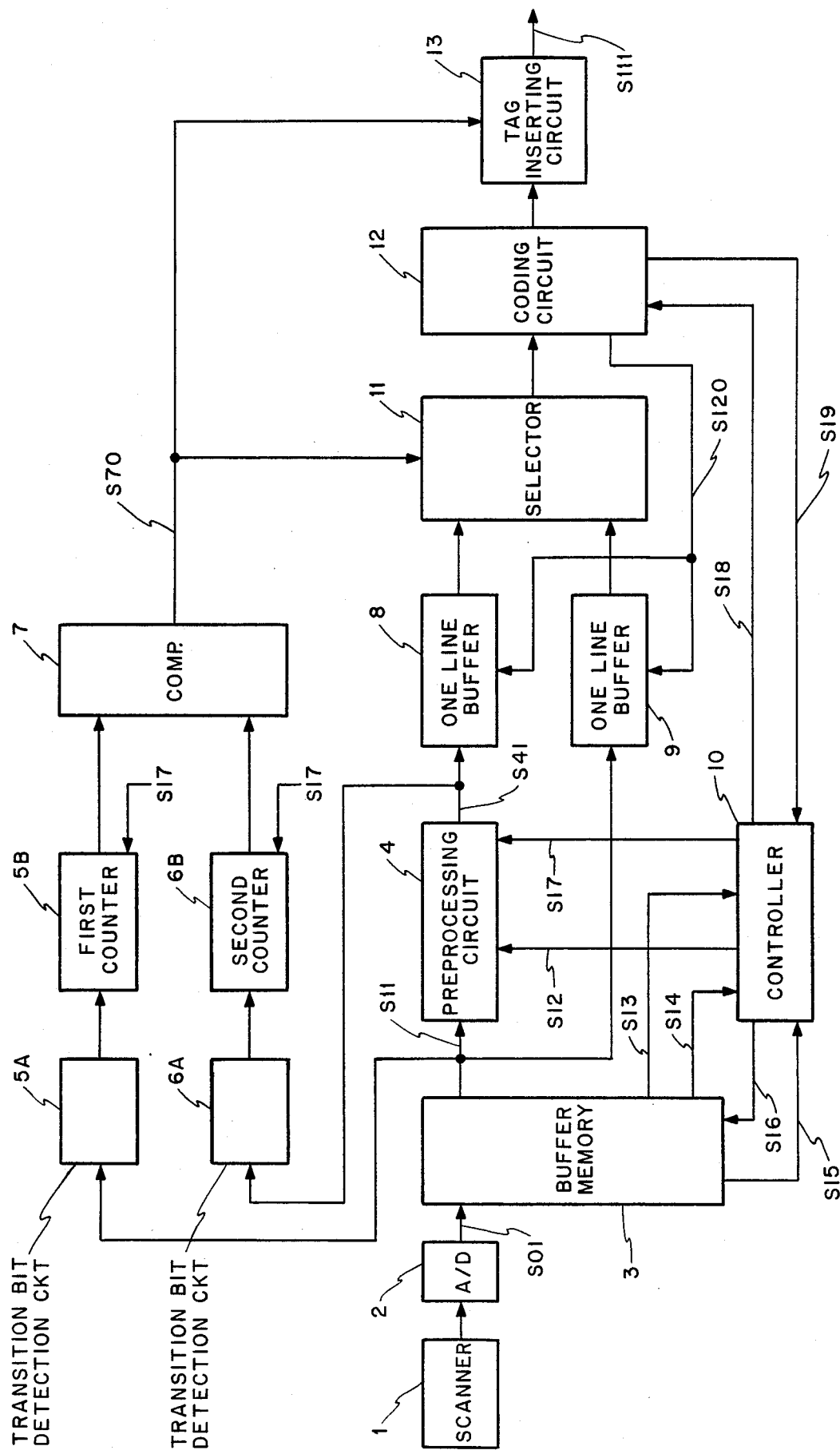
FIG. 1 is a block diagram illustrating a facsimile transmitter, to which a preferred embodiment of the invention is applied.

FIG. 1 is a block diagram illustrating a facsimile transmitter, to which a preferred embodiment of the invention is applied. In FIG. 1, a scanner 1 scans the document to be transmitted, and generates analog video signals including halftones. An analog-to-digital (A/D) converter 2 converts the analog video signals from the scanner 1, by an ordered dither method, into first digital video signals S01 each consisting of a sequence of "1" and "0" bits.

The first digital video signals S01 from the A/D converter 2, is temporarily stored in a buffer memory 3, and then supplied as video signals S11 to a preprocessing circuit 4, a first transition bit detection circuit 5A and a one-line buffer 9. The buffer memory 3, absorbs the difference in signal processing speed between the circuits on its input and output sides and, has a capacity to store the equivalent of several lines of video signals. The preprocessing circuit 4 converts short run-length digital video signals, corresponding to a photograph or a mesh-point image, into second digital video signals having greater run-lengths. This preprocessing circuit 4 uses the logic converter circuit described in the U.S. Pat. No. 4,475,127, which is incorporated herein by reference.

First and second transition bit detection circuits 5A and 6A respectively differentiate signals S11 and S41 supplied from the buffer memory 3 and the preprocessing circuit 4. Circuits 5A and 6A detect the transition points from "0" to "1" and from "1" to "0", and generates pulses indicating changes in bit. First and second counters 5B and 6B count, line by line, the pulses from the transition bit detection circuits 5A and 6A, respectively, and thereby count the numbers of runs per line. Each counter is reset, upon counting of each line, by a reset pulse S17 supplied from a controller 10.

A comparator 7 compares the counts of the first and second counters 5B and 6B line by line, and supplies a signal indicating which of the two counts is smaller. In response to the output signal of the comparator 7, a selector 11 selects line by line the signals from either of the one-line buffers 8 or 9. Thus the selector 11 is controlled by the comparator 7 to select, from the input and output signals of the preprocessing circuit 4, whichever have a smaller number of transition points per line. In specific terms, when the count of the second counter 6B is smaller than the count of the first counter 5B, the selector 11 selects the output of the one-line buffer 8, and when the count of the first counter 5B is smaller than that of the second counter 6B, the selector 11 selects the output of the one-line buffer 9. This preferential selection of the signals with fewer transition points per line contributes to raising the compression efficiency of run-length encoding. A one-line equivalent of signals selected by the selector 11 is run-length encoded by an encoding circuit 12 using the modified Huffman (MH) encoding method.

The output of the encoding circuit 12 is supplied to a tag inserting circuit 13. The tag inserting circuit 13, as will be later described in more detail, inserts at the end of a one-line equivalent of encoded data a tag code for identifying which of the outputs of the one-line buffers 8 and 9 has been selected by the selector 11.

In this embodiment, known circuits described in the U.S. Pat. No. 4,475,127 are used as the A/D converter 2 and the preprocessing circuit 4.

The A/D converter 2 includes a circuit which converts the analog video signals from the scanner 1 into the digital video signals after sampling the analog video signals pixel by pixel (bit by bit) and includes a circuit for generating threshold data which indicate the thresholds of an n-by-n dither matrix. The thresholds of the n-by-n dither matrix are periodically arranged in the main scan and subscan directions. The threshold data of each scan are repetitively generated in n-bit cycles in the main scan and subscan directions. The A/D converter 2 further compares the digital video signals and the threshold data, and generates binary signals of "1" or "1" according to the result of comparison. These binary signals are applied to the buffer memory 3 as first digital signals S01.

Figure 2:
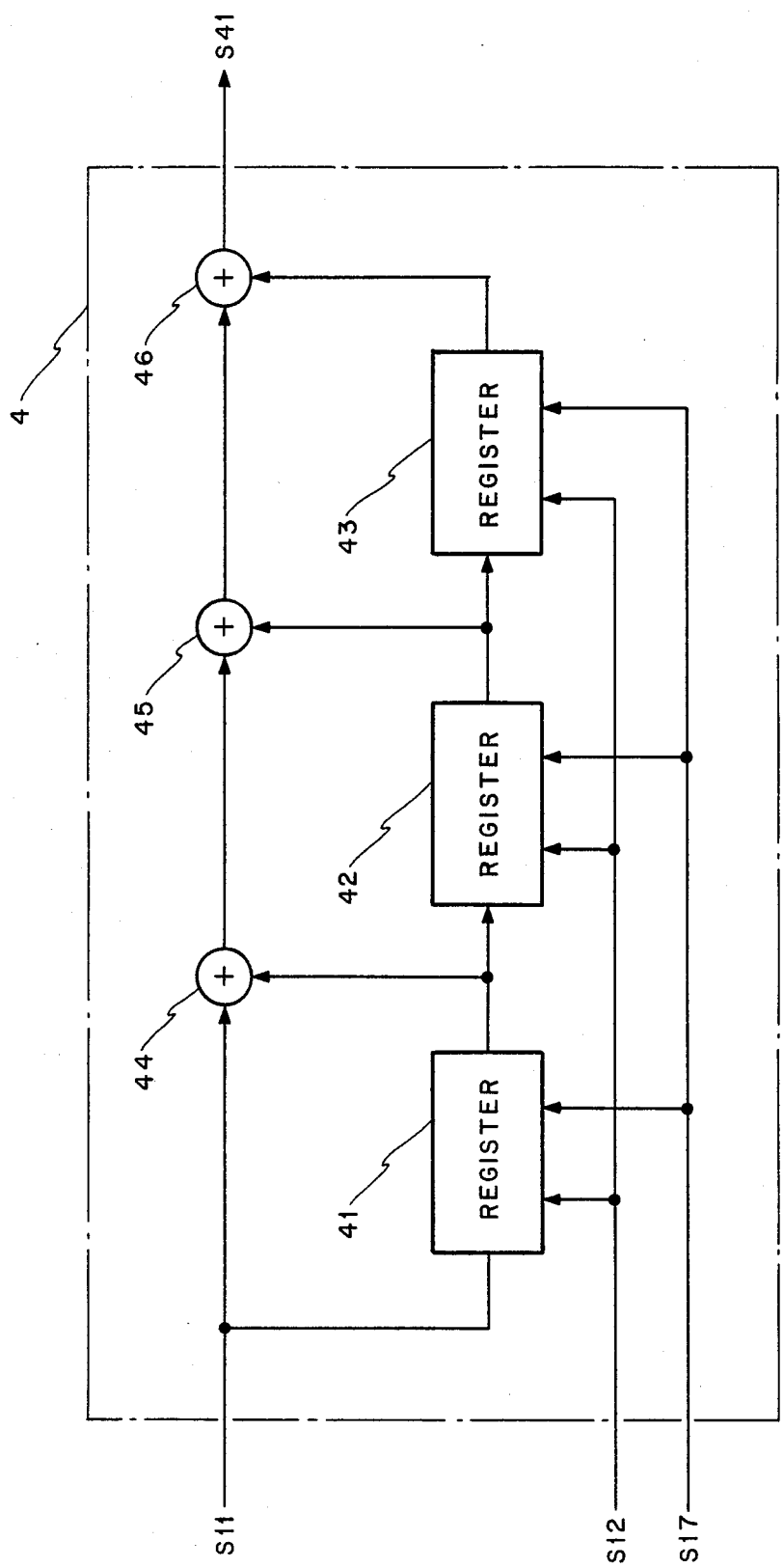
FIG. 2 is a diagram illustrating the preprocessing circuit of the facsimile transmitter of FIG. 1.

In FIG. 2, the preprocessing circuit 4 converts the bit sequence of a first digital video signal received from the buffer memory 3 into a bit sequence which is "0" when the sum of the bit sequence before conversion and $(n-1)$ signals produced by delaying this bit sequence by $1, 2, \ldots, (n-1)$ bits is an even number, or which is "1" when the sum is an odd number. The circuits to delay the bit sequence by $1, 2, \ldots, (n-1)$ are registers 41 to 43, and the sums of the delayed signals and the input signal are calculated by exclusive OR circuits 44 to 46. Reference symbols S12 and S17 respectively denote pulses for shifting to the registers 41 to 43 and a reset pulse.

As revealed in the U.S. Pat. No. 4,475,127, the preprocessing circuit 4 converts video signals repeated in periods shorter than n into signals of great run-lengths. However, it has no such effect on video signals having large white parts, such as video signals whose periods are longer than n. Preprocessing circuit 4 but is highly likely to rather shorten the run-lengths. The facsimile transmitter of FIG. 1, however, can achieve a higher compression efficiency because it selectively encodes such video signals, among the input and output video signals of the preprocessing circuit 4, as having a smaller number of runs.

Figure 3:
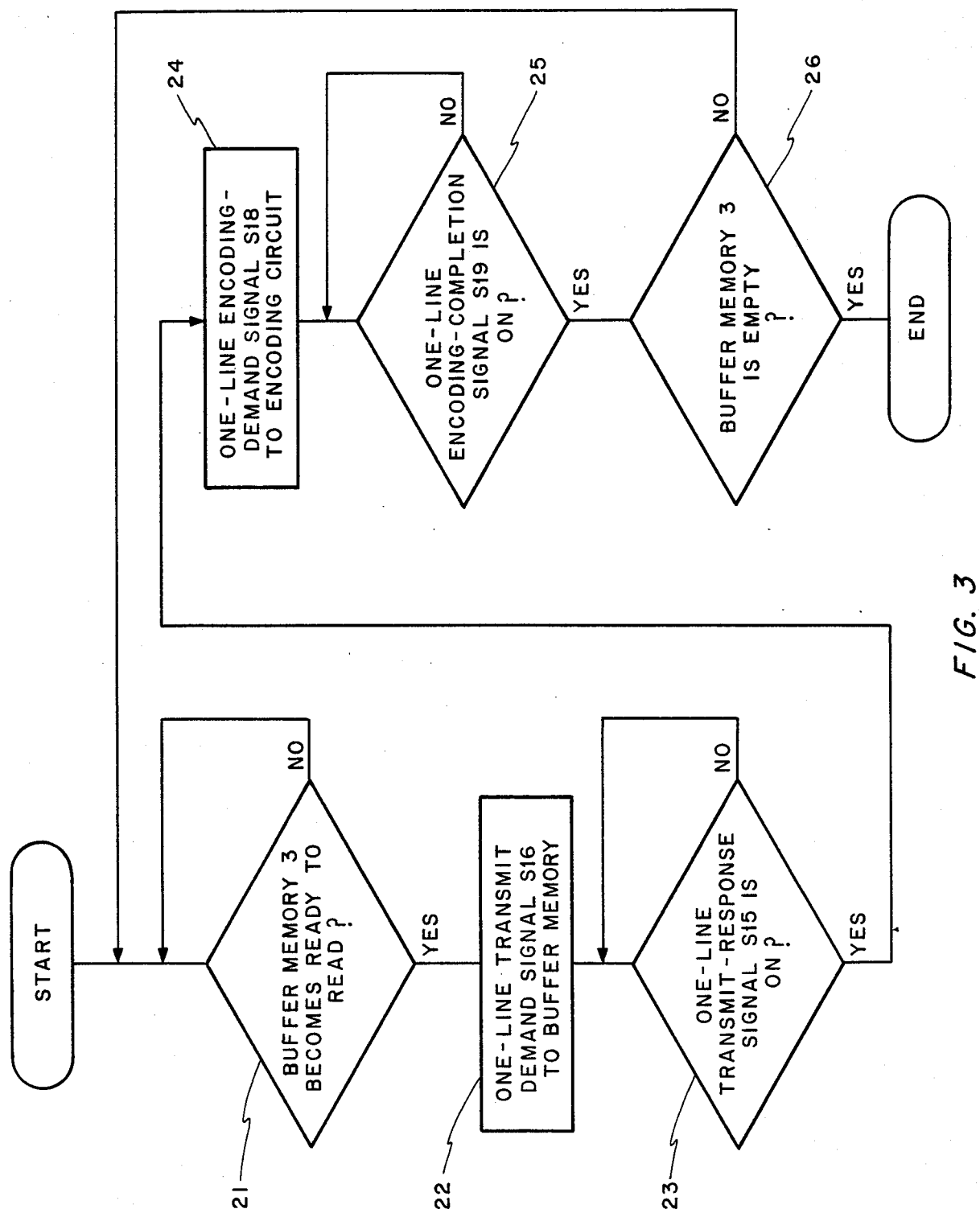
FIG. 3 is a flow chart showing the operating sequence of the controller of the facsimile transmitter of FIG. 1.

FIG. 3 is a flow chart showing the operating sequence of the controller 10 (FIG. 1).

First, the controller 10 monitors a buffer-memory-read-ready signal S13 supplied from an interface built into the buffer memory 3, and waits until the buffer memory 3 becomes ready to read (step 21). When it becomes ready to read, i.e. video data of not less one line have been accumulated in the buffer memory 3, the controller 10 turns ON a one-line transmit-demand signal S16 vis-a-vis the buffer memory 3 (step 22). Buffer memory monitors a one-line transmit-response signal S15 from the buffer memory 3 (step 23).

When the one-line transmit-response signal S15 is ON, the first and second counters 5B and 6B are counting the numbers of transition points per line. The preprocessing circuit 4 supplies a one-line equivalent of signals to the one-line buffer 8. Another one-line equivalent of signals from the buffer memory 3 are accumulated in the one-line buffer 9. Moreover, when the one-line transmit-response signal S15 is turned ON, the controller 10 turns ON a one-line encoding-demand signal S18 vis-a-vis the encoding circuit 12 (step 24).

Having received the one-line encoding-demand signal in the ON state, the encoding circuit 12 reads out video signals via the selector 11 by sending a video data read clock S120 to the buffers 8 and 9. Before sending the video data read clock S120, a selection instruction signal S70 is sent to the selector 11 from the comparator 7. The smaller number of transition points is selected as the output of the selector 11. The selection instruction signal S70 is "0" when the count of the first counter 5B is smaller than the count of the second counter 6B, or is "1" in the reverse case.

Then, the controller 10 monitors a one-line encoding completion signal S19, and waits until it is turned ON (step 25). The tag inserting circuit 13 inserts the information of the selection instruction signal S70 as a predetermined single tag bit following the leading EQL (end of line) of the run-length code, and sends out a tag-inserted video signal S111. When the one-line encoding completion signal S19 is turned on, it means the completion of run-length encoding of a one-line equivalent. The controller 10, monitoring a buffer memory empty signal S14 (step 26), will execute the same sequence of line processing as above described on the next line if the buffer memory 3 is not empty (contains data). The tag-inserted video signal from the tag inserting circuit 13 is sent out to the communication line by way of a known transmission control section and a modem.

Figure 4:
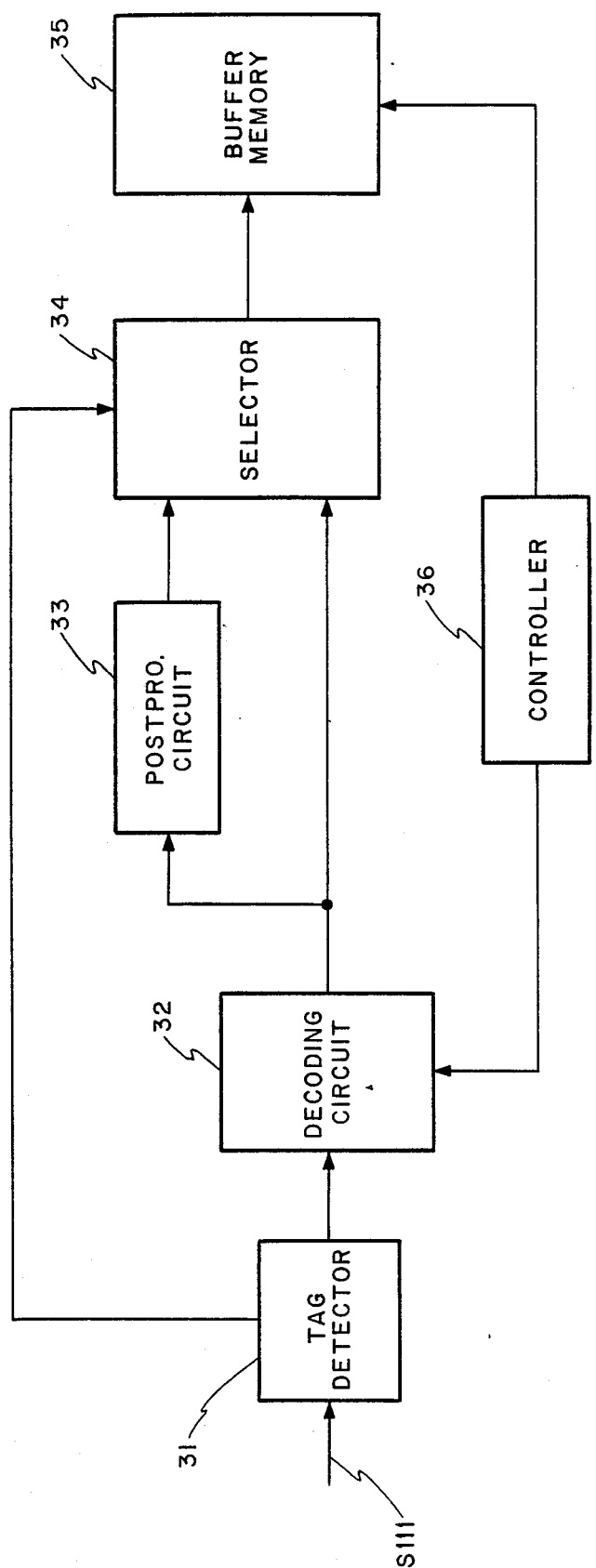
FIG. 4 is a block diagram illustrating a decoder of a preferred embodiment of the invention.

FIG. 4 is a block diagram illustrating a decoder for decoder the tag-inserted video signal S111 sent from the facsimile transmitter of FIG. 1.

Referring to FIG. 4, a tag detecting circuit 31, separates the single tag bit following the EQL. At the same time, circuit 31 determines whether the tag bit is "1" or "0" and, outputs "1" if the tag bit is "1", or "0" if the tag bit is "0", as a select signal 70'. A decoding circuit 32 decodes, line by line, encoded signals S31 which are received from the tag detecting circuit 31, and sends out video signals S32.

A postprocessing circuit 33 processes signals in a way which is exactly the reverse of the way that the preprocessing circuit was used in the facsimile transmitter of FIG. 1. Its output video signals S33 are supplied to a selector 34. The selector 34 selects a video signals S33 when the select signal S70' is "1" or a video signal S32 when the select signal S70' is "0". Video signals selected by the selector 34 are temporarily accumulated in a buffer memory 35. The video signals accumulated in this buffer memory 35 are the same as the video signals accumulated in the buffer memory 3 of FIG. 1. The output of the buffer memory 35 is outputted line by line to the recording circuit (not shown) of a facsimile unit and recorded on recording paper. A controller 36 controls the decoding timing of the decoding circuit 32 and the writing into and reading out of the buffer memory 35.

If the facsimile transmitter of FIG. 1 and the decoder of FIG. 4 are connected, the selector 34 of the decoder will select output video signals S33 of the postprocessing circuit 33 when the selector 11 of the transmitter has selected the second digital video signals from the preprocessing circuit 4. Or, selector 34 will select video signals S32 when the selector 11 has selected video signals which have passed through the preprocessing circuit 4. Therefore, the recording circuit faithfully reproduces the photographic part and characters of the document scanned by the scanner 1.

The applications of the present invention are not limited to the preferred embodiment. For instance, although the logic converter described in the U.S. Pat. No. 4,475,127 is used as the preprocessing circuit 4 in FIG. 1, any other suitable circuit can be used in its place only if it can extend the run lengths of input video signals by inverting some of the codes of a bit sequence of a prescribed pattern among the first digital video signals from the A/D converter 2. Further, although the facsimile transmitter of FIG. 1 uses the buffer memory 3, this buffer memory 3 can be dispensed with if the scanning speed of the scanner 1 and the output timing of analog video signals are properly controlled. The selector 4 in the decoder of FIG. 4, which selects the output of either the postprocessing circuit 33 or the decoding circuit 32, could choose between the inputs of the buffer memory 35 and the postprocessing circuit 33 as the destination of the output of the decoding circuit 32.

What is claimed is:

1. In an encoder apparatus for use in a digital transmission of video signals including halftones, said encoder apparatus comprising:

A/D converter means for converting halftone video signal pixels into first digital signals of a "1" or "0" bit by comparing said halftone video signals with threshold data which is periodically generated;

converting means for converting said first digital signals into second digital signals whose run-lengths of "1" and "0" codes are extended depending upon the characteristics of said first digital signals;

first counting means for counting a number of runs contained in each line of said first digital signals;

second counting means for counting the number of runs contained in each line of the second digital signals;

selecting means for selecting any of said first and second digital signals according to the numbers of the counts of said first and second counting means, said first digital signals being selected when the count output of said first counting means is smaller than the count of said second counting means;

encoding means for run-length encoding the digital signal selected by said selecting means to generate encoded video signals; and tag inserting means for inserting first and second tag data indicating the selection of said first and second digital signals, respectively, by said selecting means.

2. An encoder apparatus, as claimed in claim 1, wherein said A/D converting means converts halftone video signals into binary signals by an ordered dither method, thereby outputting said first digital video signals.

3. An encoder apparatus, as claimed in claim 2, wherein said converting means delays a bit sequence of said first digital signals by 1, 2, 3, . . . , n−1 (n is a positive integer), and outputs a signal indicating whether the sum in number of the (n−1) delayed signals and a pre-delay signal is an even number or an odd number.

4. An encoder apparatus, as claimed in claim 1, wherein said first and second counting means count the numbers of transitions of said first and second digital video signals, respectively, from "1" to "0" and from "0" to "1".

5. A decoder apparatus, electrically coupled to the tag inserting means of the encoder claimed in claim 1, for decoding said encoded video signals and outputting decoded signals to an output line, said decoder apparatus comprising:

tag detecting means for detecting said fist and second tag data from said encoded video signals;

decoding means for decoding said encoded video signals and outputting third digital signals;

other means for converting in a way which is opposite to a way in which said converting means converts, said other means converting third digital signals from said decoding means into fourth digital signals; and means for selectively sending out said third digital signals, if said tag detecting means detects the first tag datum, or said fourth digital video signals, if the tag detecting means detects the second tag datum, to said output line.

6. A video signal processing system comprising means responsive to a scan of a document for generating analog video signals including representation of half tones which appear on said document, means responsive to said analog signals for converting said analog signals into digital signals, means for processing said digital signals, characterizing means on opposite sides of said digital processing means jointly responsive to reference level data and to said digital signals for separately characterizing successive half-tone signals as being above or below a transition level, means on opposite sides of said digital signal processing means responsive to said characterizing means for comparing on a line-by-line basis a number of transitions between signals above and below said reference level, means for selecting a line of the signals on the side of said processing means which has the least number of transitions, means responsive to said selected line for encoding said selected line of signals, and means for marking with a tag signal the end of each encoded line of signals in order to indicate whether the selected and encoded line of signals was taken from before or after said processing means.

7. The system of claim 6 and means on opposite sides of said signal processing means for buffer storing said signals pending a selection of the line with the least number of said transitions.

8. The system of claim 7 wherein said signals on an input side of said processing means are a relatively short run-length of signals and said signals on an output side of said processing means are a relatively long run-length of signals.

9. The system of claim 6 wherein said processing circuit comprises means for assembling said digital signals into bit sequences, means for giving one signal when the sum of a bit sequence before conversion and (n−1) signals produced by delaying this bit sequence by 1, 2, ... (n−1) bits is an even number and which is another signal when the sum is an even number, said signal and said other signal being said transitions.

10. The system of claim 9 wherein said comparing means comprises two counters for separating counting the number of said transitions at each side of said digital signal processing means.

11. The system of claim 6 and decoding means jointly responsive to receipt of said encoded signals and to said tag signal for including or excluding a signal processing means depending upon whether said selected signal included or excluded said processing.

12. An encoded/decoder system for video signals with truer half-tone conversion, said system comprising means responsive to a scanned image for producing analog video signals with signals indicating half-tones, means responsive to said analog signal for converting said analog signals into digital signals having a run length, means responsive to said digital signals for preprocessing them by increasing their run length, means for monitoring and comparing said digital signals both before and after said preprocessing to detect which of said compared signals appears to be a best rendition of said scanned image, means responsive to said comparison for selecting the best signal, means for marking the end of the selected signal with one of two-tag signals depending upon whether the before or after preprocessing signals are selected as the best signal, and means for transmitting said selected signals.

13. The system of claim 12 and means for making said comparison in response to a number of transitions of said digital signals above and below a threshold reference data which represents a half-tone datum, and said preprocessing means extending the run lengths of said transition signals.

14. The system of claim 13 wherein said minotir and comparing means comprises means for counting said transitions before and after said preprocessing.

15. The system of claim 14 and decoder means jointly responsive to the receipt of said transmitted signals and to said tag signals for reconverting said signals into said original signals by including or excluding a postprocessing depending upon whether said tag signal indicates that said preprocessed signal was or was not included in the transmitted signal.

* * * * *